United States Patent Office 3,438,341
Patented Apr. 15, 1969

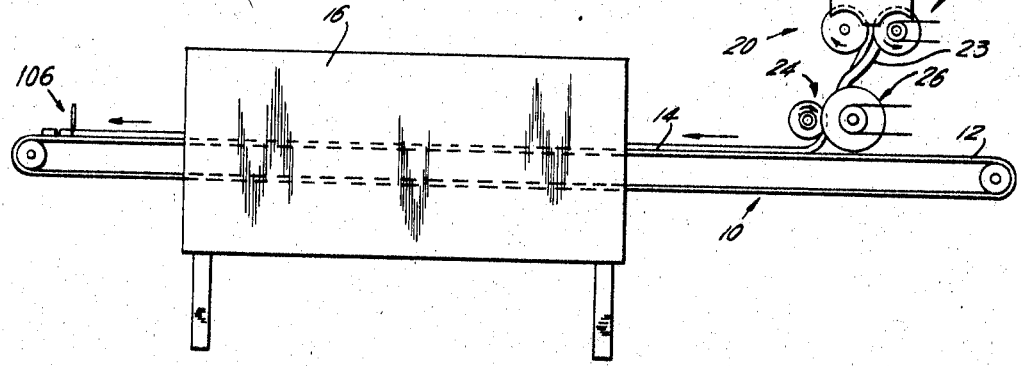
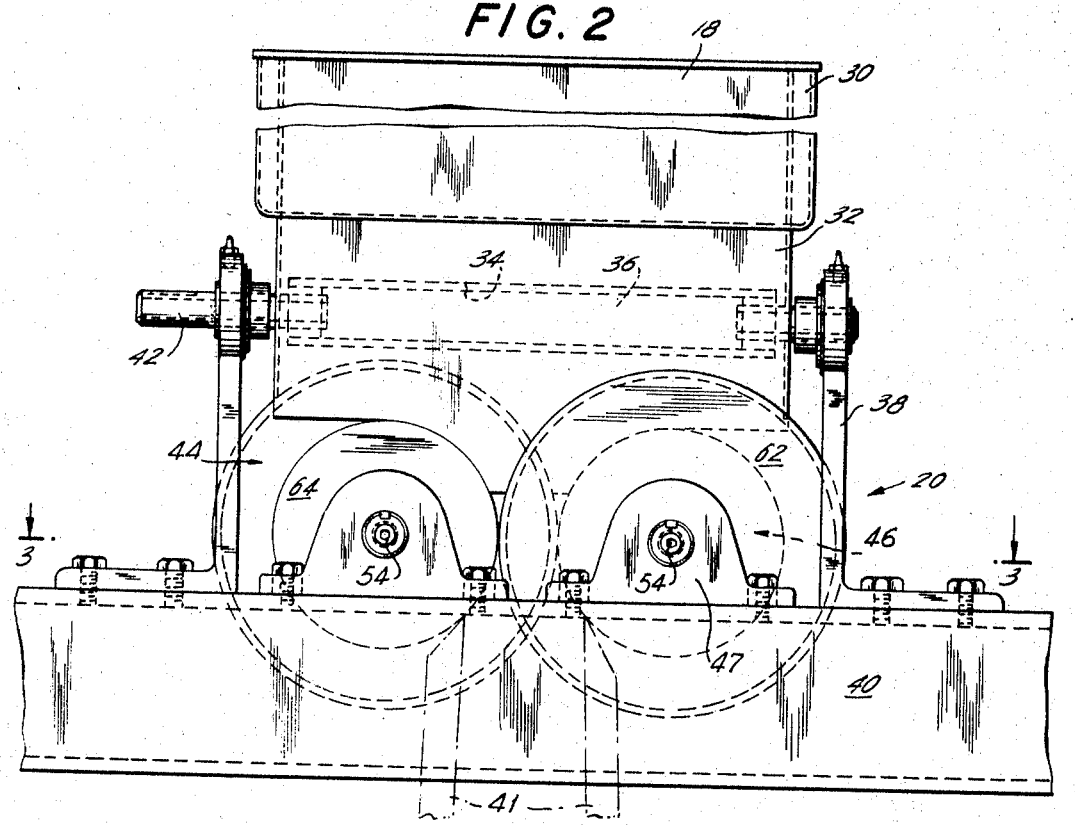

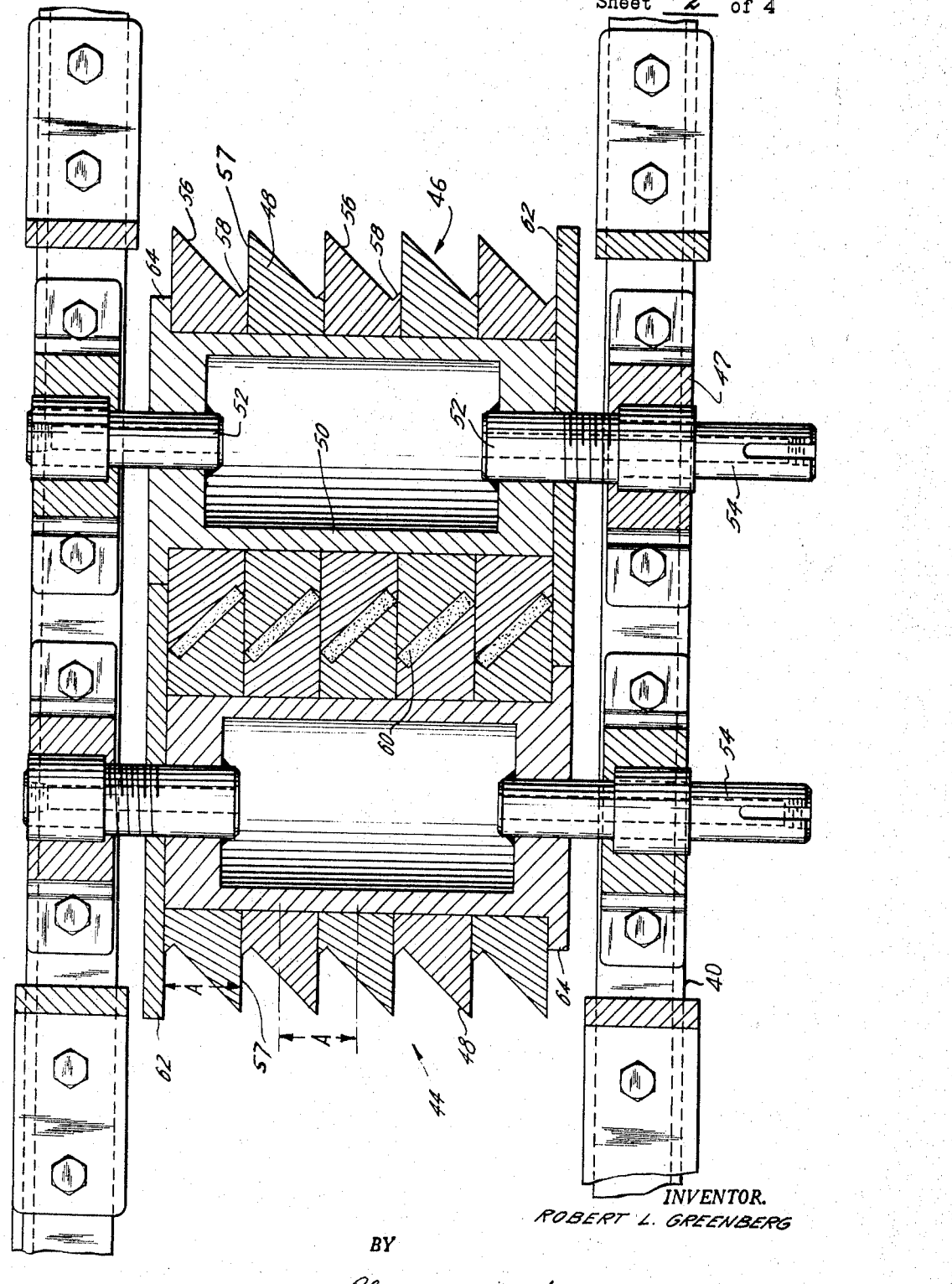

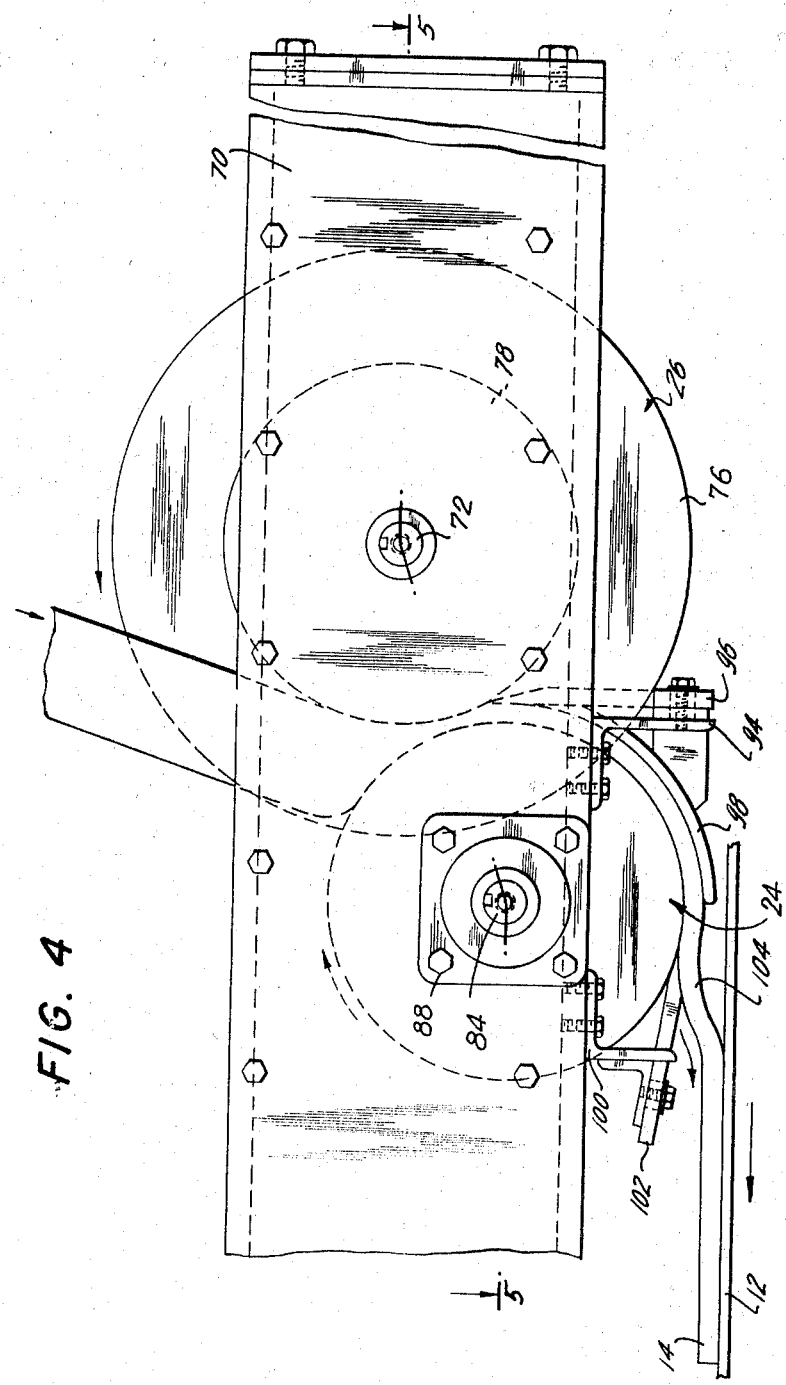

3,438,341
CANDY FORMING METHOD AND APPARATUS
Robert L. Greenberg, Englewood, N.J., assignor to National Equipment Corporation, Bronx, N.Y., a corporation of New York
Filed Feb. 7, 1966, Ser. No. 536,491
Int. Cl. A23g 3/06
U.S. Cl. 107—69                                    9 Claims

ABSTRACT OF THE DISCLOSURE

A candy forming apparatus according to which the entire volume of a mass of plastic material is converted into individual candy pieces of a predetermined length without any waste. The entire volume of the mass of plastic material is simultaneously sheared into a plurality of ropes while the mass is simultaneously shaped at each rope to provide each rope with a predetermined cross-sectional configuration which subsequently is changed into the final configuration of the candy pieces. The shearing of the mass of plastic is brought about by way of a roller means which determines the configuration of the ropes solely by maintaining in engagement with the plastic material moving surfaces with the shearing roller means defining spaces through which the plastic material passes and which determine the entire cross-sectional configuration of the ropes. The ropes which are provided in this way by the shearing roller means are subsequently acted upon by sizing roller means which change the cross sectional configuration of the ropes, after which the thus-changed ropes are conveyed away by a conveyor means.

---

The present invention relates to the manufacture of candy.

As is well known, candy in the form of bars, for example, is conventionally manufactured from an edible mass of liquid material. This liquid is poured onto a belt where it is cooled, and the resulting mass is sized down to a uniform specified thickness by a series of sizing rollers.

In this way, the conventional method and apparatus provides a cooled, sized sheet which is then cut into a multiplicity of strips of a desired width by a series of circular knife blades mounted on a common shaft. These cut strips are then separated alternately while transported one up and one down, so that adjacent strips do not stick to each other. The strips are then spread apart to provide a predetermined spacing therebetween, and a plurality of belts are used for this purpose. The spaced strips are then cut to length and brought back to a common level.

The above conventional method thus provides two strips of scrap, one at each side of the sheet. Moreover, this conventional method and apparatus requires replacement of worn belts, sharpening of worn circular knives, and presents the problem of accurately sizing a hot, sticky material.

Conventional methods and apparatus which manufacture candy in the above described general way, suffer from the drawbacks of being extremely complex as well as involving high operating costs, so that the cost of the resulting products are undesirably high. One of the primary drawbacks of the conventional method and apparatus resides in the fact that scrap is unavoidably created, and this scrap is removed and reprocessed, resulting in unavoidable excess costs. In addition, the plastic mass is unavoidably moved, with the conventional method and apparatus, with respect to substantial areas of stationary surfaces, giving rise to undesirable sticking of the mass against such surfaces, with the resulting difficulties which also increase the costs undesirably.

It is accordingly a primary object of the invention to provide a method and apparatus which is far simpler and far less costly than the conventional method and apparatus, requiring far less machinery and far less maintenance.

It is in particular an object of the invention to provide shearing rolls which will produce preformed ropes from plastic material, the shearing rolls of the invention performing the functions of cutting, separating and presizing the ropes as well as determining the spacing or pitch therebetween.

It is also an object of the invention to provide a method and apparatus which will result in a far more efficient and more rapid cooling of the material which is worked on.

Furthermore, it is an object of the invention to provide a method and apparatus which will greatly simplify and facilitate control of the configuration of the products achieved from the method and apparatus of the invention.

Furthermore, it is an object of the invention to provide a method and apparatus capable of carrying out a continuous treatment of a plastic mass, forming it into individual bars of predetermined cross-sectional configuration and length, so that the inconveniences of batch rather than continuous treatment are avoided.

One of the primary features of the method of the present invention resides in the step of converting the entire volume of a mass of plastic material which issues from a hopper or the like, into ropes, so that in this way creation of scrap is avoided, and thus the necessity of removing the scrap and reprocessing it is also avoided.

Furthermore, with the present invention the apparatus includes upper roller means and lower roller means, the upper roller means being a shearing roller means which shears the entire volume of plastic material issuing from a hopper or the like over the upper roller means into ropes of predetermined cross-sectional configuration which are received by the lower roller means. The lower roller means are sizing roller means which give to the ropes their final cross-sectional configuration, and a conveyor means receives the ropes from the lower sizing roller means. At the conveyor means the ropes can be cut into the desired lengths after passing through a suitable cooling structure in which the individual bars are solidified, for example, before passing on to enrobing machines, wrapping machines, and the like.

The invention is illustrated by way of example in the accompanying drawings which form part of the application and in which:

FIG. 1 is a schematic side elevation of one possible embodiment of an assembly according to the invention, showing the manner in which the method and apparatus of the invention fits into the entire general method and apparatus for manufacturing candy;

FIG. 2 is a fragmentary side elevation on an enlarged scale as compared to FIG. 1, showing the arrangement of upper shearing rolls of the invention beneath a hopper, the shearing rolls being shown in FIG. 2 in an end view;

FIG. 3 is a sectional plan view taken along line 3—3 of FIG. 2 in the direction of the arrows and showing details of the shearing rolls of the invention;

FIG. 4 is an end view of the lower sizing rolls of the apparatus of the invention, FIG. 4 showing how the ropes are received and treated by these rolls as well as separated therefrom and delivered to the conveyor means.

Figure 5:
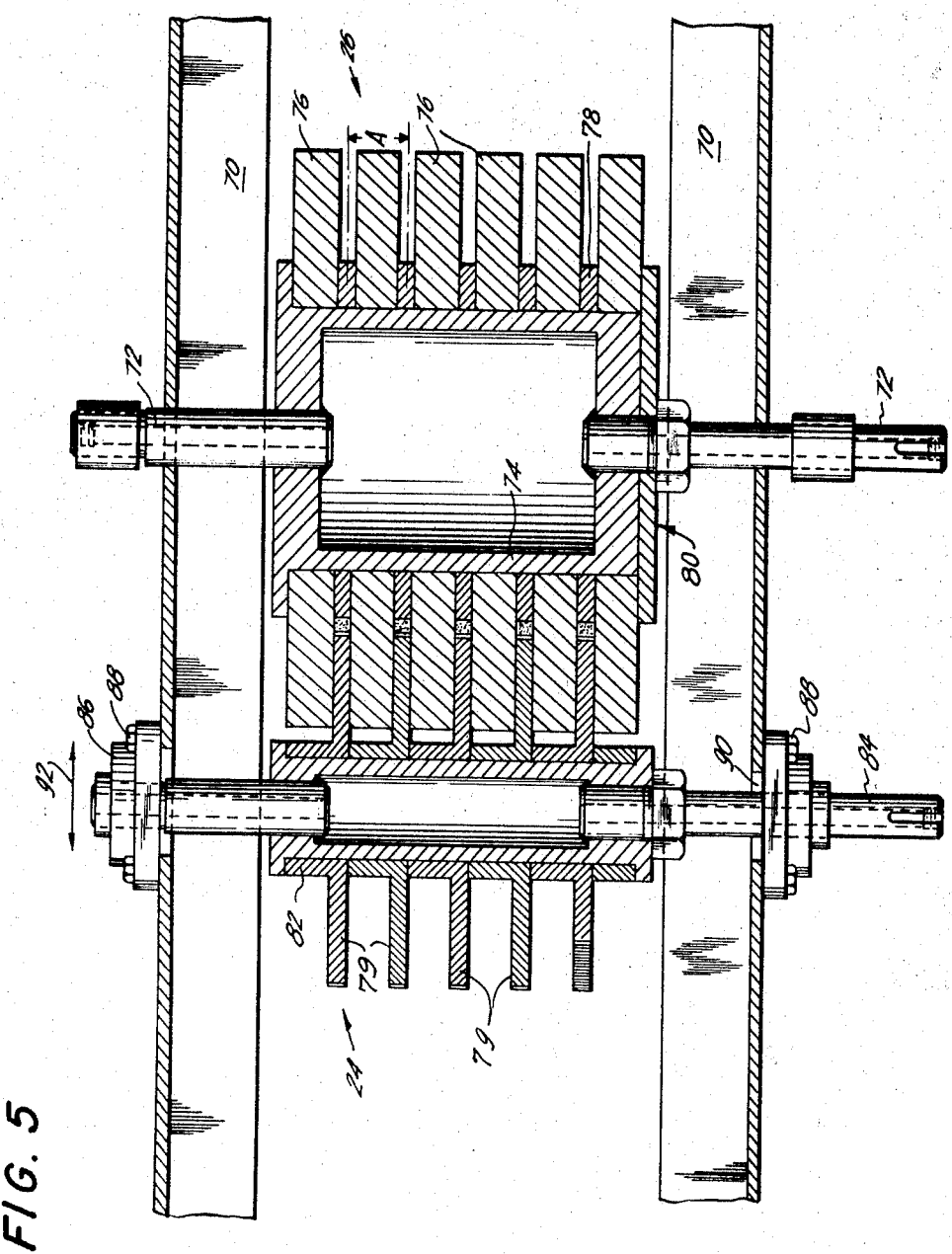
FIG. 5 is a sectional plan view of the rollers of FIG. 4 taken along line 5—5 of FIG. 4 in the direction of the arrows.

Referring to FIG. 1, there is schematically illustrated therein a conveyor means 10 in the form of a belt, for example, having an upper run 12 which moves to the left, as viewed in FIG. 1. On this upper run 12 are situated the individual ropes or strips 14 which are conveyed through a cooling tunnel 16 in which the temperature of the ropes 14 is reduced so that relatively solid strips issue from the cooling tunnel 16 to be cut into bars and transported to an enrober, for example.

The individual ropes 14 are derived from a plastic material, such as caramel, or the like, issuing from a supply means formed, for example, by a suitable hopper 18. The mass is delivered to the hopper 18 precooled to the desired consistency and issues from the hopper outlet at such consistency.

As the plastic material issues from the supply means 18, it is received by an upper shearing roller means 20, the details of which are described below. The shearing roller means 20 preferably includes a pair of identical sets of roller assemblies interconnected by suitable gearing for example, so that one set is driven in response to rotation of the other, and the driving set may be driven in any suitable way as by a belt-and-pulley drive 22 schematically indicated in FIG. 1.

The shearing roller means 20 of the invention shears the entire volume of the mass which issues from the hopper 18 into a plurality of ropes, so that no scrap is created, and these ropes are guided by guides 23 to a lower sizing roller means of the present invention. This sizing roller means includes a pair of roller assemblies 24 and 26 which are described in detail below, and these assemblies are interconnected by suitable gearing, for example, so that one assembly is driven in response to rotation of the other, in the same way as the drive for the shearing roller means 20. The driving assembly may be driven in any suitable way, as by the belt-and-pulley drive 28 indicated schematically in FIG. 1.

Referring to FIG. 2, it will be seen that the supply means formed by the hopper 18 has an open top into which the material is delivered at the prescribed temperature in any manner well known in the art. The side walls 30 are hollow, as indicated in FIG. 2, so that a cooling fluid can be circulated therethrough for the purpose of initiating the cooling of the pasty mass in the hopper 18. The hopper 18 has a lower wall formed with an elongated outlet opening through which the plastic material issues downwardly to the shearing roller means 20, and the hopper includes a pair of end walls 32 slideably engaging end faces of the pair of roller assemblies which form the shearing roller means 20. These end walls 32 are respectively formed with elonagted rectangular openings 34 into which rollers 36 protrude, and these rollers 36 are supported by bearings carried by brackets 38 mounted on bars 40 of the framework of the machine. The ends 42 (FIG. 2) of shafts which carry the rollers 36 can be connected with any suitable driving elements, such as pulley belts, or the like, for the purpose of driving the rollers 36 in directions where they will guide and advance the pasty mass downwardly into the cusp or nip of the pair of roller assemblies which form the shearing roller means 20, thus preventing side drag.

These roller assemblies are shown in detail in FIG. 3. The roller assemblies 44 and 46 are identical and have parallel axes. They are water-cooled and supported for rotation by bearings of pillow blocks 47 mounted on the framework members 40. Each of the assemblies 44 and 46 is made up of a series of annular identical roller elements 48 arranged in each assembly coaxially in a row directly engaging each other and oriented in the same direction. The annular roller elements 48 surround and are fixed to a cylindrical hub 50 through which cooling water is circulated by way of the tubular shafts 52 which support the assemblies, and the manner in which the shafts 52 are bored to accommodate cooling water flowing therethrough is well known in the art. The axially bored shafts 52 have the elongated free end portions 54 which receive suitable gears through which the transmission passes from one of the roller assemblies to the other with the drive being derived from any suitable source, such as the belt-and-pulley assembly 22 referred to above and shown in FIG. 1.

The several annular roller elements 48 of each assembly thus turn as a unit and they are arranged one next to the other in the manner indicated in FIG. 3. Each roller element 48 has an annular exterior periphery of V-shaped cross section, composed of a pair of frusto-conical surface portions 56 and 58 which intersect each other in order to provide each element 48 with the V-shaped cross section at its outer periphery. Moreover, it is to be noted that the frusto-conical peripheral surface portion 56 is considerably longer than and extends outwardly beyond the frusto-conical surface portion 58 of each element 48 in the manner indicated in FIG. 3.

The identical roller assemblies 44 and 46 are arranged with their axes parallel but with one of these assemblies reversed with respect to the other, so as to provide the arrangement indicated in FIG. 3 where the peripheral surfaces of the elements 48 of one assembly cooperate with the peripheral surfaces of the elements 48 of the other assembly to define the passages 60 at the nip or cusp formed between the roller assemblies. Also, as indicated in FIG. 3, the flat surfaces 57 of one of the roller assemblies slideably engage the flat surfaces 57 of the other of the roller assemblies to provide at the nip or cusp between the roller assemblies the shearing of the mass of plastic material which passes downwardly through the passages 60.

With this construction, all of the mass issuing from the hopper will be received between the pair of end plates 62 and 64 at one end of the shearing roller means and the corresponding pair of end plates 62 and 64 at the other end of the shearing roller means. These end plates 62 and 64 are simple circular plates forming the ends of the assemblies in the manner shown most clearly in FIGS. 2 and 3.

With this construction not only is the entire mass formed into ropes of rectangular cross section passing downwardly through the passages 60 and having a configuration determined by the cross section of the passages 60, but in addition the surfaces 57 will provide a shearing of the ropes from the mass issuing from the hopper, and the passages 60 are oriented in such a way that the ropes have the configuration of relatively flat ribbons respectively situated in parallel planes which make angles, respectively, of 45 degrees with respect to the roller axes, as is particularly apparent from FIG. 3.

The 45 degree angle of the passages 60 assures adequate separation between the preformed ropes. In addition, it will be noted that the several rollers of the assemblies each have a width A, as indicated in FIG. 3. It is this width A which is equal to the spacing between the center lines of the final strips or ribbons which are deposited on the belt 12. Therefore, the width A of the rollers and the consequent spacing between the several ropes, determined by this width A, is an important determining factor of the final positioning of the final articles. The entire mass of material issuing from the bottom of the hopper is acted upon by the rotating surfaces of the shearing roller means, and these surfaces, where they form the frusto-conical portions 56 and 58 may be knurled so as to provide a more positive movement of the plastic material. There are absolutely no stationary surfaces to restrict the movement of the plastic material. Subsequent to treatment of the material by the shearing roller means, the preformed ropes which are sheared from the mass are reduced in size to the required final cross section by the sizing roller means which is described below, and when the ropes have their final cross section they are deposited on the belt with the required spacing between the several strips deposited on the belt. The reduction in the width of the ropes and the subsequent spacing therebetween is expedited by the 45 degree angle in which the preformed ropes are situated as they move from the upper shearing roller means down to the lower sizing roller means.

As is indicated in FIG. 2, scrapers 41 engage the exterior surfaces of the rollers to facilitate the efficient removal of the ropes therefrom, these ropes being received in the guides 23 shown schematically in FIG. 1.

The guides 23 are simply in the form of elongated chutes which have smooth surfaces which slideably receive the ropes, respectively, and the chutes are twisted along their length through 45 degrees so that in this way the several ropes are turned through an additional 45 degrees to be properly aligned for entry into the lower sizing roller means, as described in greater detail below.

The details of the lower, sizing roller means are illustrated in FIGS. 4 and 5. This latter means includes also a pair of roller assemblies 24 and 26 which are water-cooled. Thus, the assembly 26 has a fixed axis of rotation formed by suitable bearings carried by the lower channel-shaped frame members 70. The coaxial tubular shafts 72 are connected with a hollow cylindrical hub 74 through which the cooling water is circulated in a manner well known in the art. The cylindrical hub 74 fixedly carries two sets of discs. The set of discs 76 forms moving surfaces which determine the width of the final ribbons 14 deposited on the belt 12. The space between the discs 76 is slightly greater than the thickness of the preformed ropes moving down from the shearing roller means, so that these ropes will be easily received in the spaces between the discs 76. However, it is to be noted that the centerline distance between the several discs 76 still is equal to the dimension A equal to the width of the shearing rollers 48, so that in this way the spacing between the final strips will be determined. Moreover, it is the space between the discs 76 which will determine the width of the final strips deposited on the belt 12. Between the discs 76 which are fixed to the cylindrical hub 74 for rotation therewith, are respectively situated the sizing discs 78 which are of a diameter considerably smaller than the discs 76, and the discs 78 are also fixed to the cylindrical hub 74 for rotation therewith. The assembly is completed by end plates 80.

The roller assembly 24 includes an elongated tubular cylindrical hub 82 through which cooling water is circulated by way of the hollow shafts 84 supported in bearings carried by blocks 86 which are fixed by bolts 88 to the frame members 70. These bolts are situated in horizontaly extending slots and cooperate with suitable nuts to enable the bolts to be fixed to the frame member 70, and the shafts 84 themselves extend through horizontally extending slots 90 formed in the supports 70, so that in this way the roller assembly 24 can be adjusted toward or away from the roller assembly 26 as indicated by the arrow 92. The discs 78 thus form with the discs 79 the thickness of the final ribbon, the magnitude of this thickness being determined by the spacing between the discs 78 and 79. The exterior peripheral surfaces of the discs 78 and 79 are knurled so that they are relatively rough to provide a positive engagement and positive advance of the plastic ropes, thus eliminating any possibility of slippage between the ropes and the rotating discs 78 and 79.

Furthermore inasmuch as the cross section of the ropes is reduced by the sizing roller assemblies 24 and 26, these roller assemblies are rotated at a speed greater than the shearing roller means 20 so as to compensate for the change in cross sectional area of the ropes and provide for continuous treatment thereof.

Referring to FIG. 4, it will be seen that a bracket assembly 94 is fixedly carried by and extends beneath the frame members 70. This bracket assembly 94 fixedly carries a plurality of scraper or doctor blades 96 which extend into the spaces between the several discs 76 into slideable engagement with the peripheries of the discs 78 so as to engage the final strips and positively remove them from the periphery of the discs 78. In addition, the bracket assembly 94 carries curved guide fingers 98 which engage the ropes and guide them along the peripheries of the discs 79 at the locations where the discs 79 emerge beyond the discs 76. A second bracket assembly 100 is fixedly carried by the frame member 70, and this bracket assembly fixedly carries scrapers or doctor blades 102, which remove the ropes 104 from the several discs 79, and these ropes become deposited upon the upper run 12 of the conveyor means 10, as pointed out above, with the distance between the centerlines of the ropes on the upper run 12 being equal to the dimension A.

A conventional cutter assembly 106 reciprocates and cooperates with the conveyor means in a well known manner for cutting the individual strips, which are arranged in parallel lengths on the conveyor, into the bars of predetermined length. Instead of individual scraper elements 102 a common scraping blade or doctor blade may extend across all of the several discs 79.

The manner in which the mass issuing from the hopper 18 into the passages 60 to form the ribbon-shaped ropes of rectangular cross section in the parallel planes which are at 45 degrees to the roller axes of FIG. 3, has been described in detail above.

When these ropes are first formed they are guided by guides 23 (FIG. 1) into the spaces between the discs 76. The spaces between the discs 76 and thus the thickness of the rollers 78 and 79 is greater than the thickness of the ropes formed in the passages 60. Therefore, once these ropes are started along their downward movement they will move easily into the spaces between the discs 76 and they will continuously move into these spaces while automatically being turned by guides 23 through an additional 45 degrees beyond the angular orientation indicated in FIG. 3 into an orientation where they are in parallel planes which are perpendicular to the roller axes. It is in this latter condition that the ropes pass down between the sizing roller assemblies 24 and 26, and because of the flexible nature of the ropes, they turn easily through the additional 45 degrees required to orient them properly with respect to the gaps between the discs 76.

Inasmuch as the width of the discs 78 and 79 is greater than the width of the ropes formed in the passages 60, the width of the ropes is determined at the lower sizing roller means of the invention. The thickness of the ropes is changed in the manner indicated most clearly in FIG. 4, and this thickness is controlled by the positioning of the discs 79 with respect to the discs 78 in the manner pointed out above.

Therefore, the cross-sectional dimensions of the preformed ropes is determined by the shearing roller means, while the cross-sectional dimensions of the final strips is determined by the sizing roller means, and with the structure of the invention all of the mass issuing from the hopper is converted into the strips 14, thus eliminating the possibility of any scrap and the requirement to remove and reprocess the same.

In addition, it will be noted that throughout its passage through the roller assemblies the ropes engage surfaces which are moving at all times. In other words, the discs 76, 78 and 79 continuously rotate and it is only with these discs that the ropes come into physical contact before reaching the scrapers 96 and 102 which displace the ropes away from the sizing rollers.

At the shearing roller means the mass is also engaged exclusively by continuously moving surfaces.

Even at the scrapers 96 and 102, it is to be noted that these elements are spaced considerably apart from each other, so that there is no one localized area where there is any substantial amount of stationary surface against which the mass must slide.

It is to be noted that the shearing of the mass into the 45 degree planes shown most clearly in FIG. 3, determines the spacing between the ropes inasmuch as they will only turn for an additional 45 degrees while inclined down from and traveling downwardly toward the lower sizing rollers, so that the width of the discs 76 is determined by the centerline spacing between the ropes (dimension A) which is initially determined by the shearing roller means. The width A of the shearing roller gives the required spacing. The shearing rolls perform the functions of cutting, separating, and presizing the ropes as well as determining the spacing or pitch therebetween. This 45 degree angle in the particular example illustrated is the optimum angle for achieving the desired spacing consistent with the desired cross section. Where the cross section of the ropes is reduced to approximately one quarter of their original cross section by the lower sizing rollers, these lower rollers will advance the ropes at a speed four times that of the upper rollers in order to compensate for the reduction in the cross-sectional area of the ropes.

The temperature of the mass in the hopper and as fed to the rollers must be below the point where the material is sticky. In one specific case, caramel was used, and this mass lends itself admirably to the process and apparatus of the invention because of the fat content which acts as a lubricant. Where caramel is used it is generally maintained at a temperature below 100° F.

Thus, it will be seen that with the structure and method of the invention a very simple and highly economical system is provided requiring very little machinery and maintenance. There is no creation of scrap strips which have to be reprocessed. Because of the fact that the entire mass is converted into the ropes, less mass is required to provide a given volume of products. Since three surfaces of the finished strips are exposed when the strips are laid down on the belt, fast efficient cooling can be achieved.

In addition, with the method and apparatus of the invention, it is much easier to control the size and shape of the individual bars.

Furthermore, the single continuous straight-line operation eliminates the necessity of handling any liquid masses.

I claim:

1. In a candy manufacturing method, the steps of simultaneously shearing from the entire volume of a mass of plastic material a plurality of ropes while simultaneously shaping each rope over its entire surface to provide it with a predetermined ribbon-shaped cross-sectional configuration and while engaging each rope over its entire surface exclusively with surfaces rotating about parallel axes, having rolling contact with each rope, and situating said ribbons in planes inclined at an acute angle with respect to said axes, subsequently changing the predetermined cross-sectional configuration to the final cross-sectional configuration of said ropes as they continue to move, and thereafter severing said ropes to form individual candy pieces of predetermined length.

2. In a candy manufacturing apparatus, supply means for supplying a mass of plastic material, upper shearing roller means situated beneath said supply means for receiving the mass of plastic material therefrom and for shearing the entire volume of material received from said supply means into a plurality of ropes which advance continuously downwardly beyond said upper shearing roller means, said shearing roller means engaging the plastic material exclusively with rolling surfaces over the entire exterior surface area of the ropes and being formed with spaces through which the plastic material passes and the configuration of which determine the entire cross-sectional configuration of the ropes, said spaces respectively providing said ropes with the configuration of ribbons and respectively situating said ribbons in planes which make an acute angle with respect to an axis about which at least part of said shearing roller means rotates, lower sizing roller means situated beneath said shearing roller means and receiving said ropes therefrom for changing the cross-sectional configuration of said ropes and providing them with a predetermined cross-sectional shape, and conveyor means receiving the ropes from said lower sizing roller means.

3. The combination of claim 2 and wherein said shearing roller means provides said ropes with a given cross-sectional area and said sizing roller means changes the width and thickness of said ropes.

4. In a candy manufacturing apparatus, supply means for supplying a mass of plastic material, upper shearing roller means situated beneath said supply means for the receiving of the mass of plastic material therefrom and for shearing the entire volume of material received from said supply means into a plurality of ropes which advance continuously downwardly beyond said upper shearing roller means, lower sizing roller means situated beneath said shearing roller means and receiving said ropes therefrom for changing the cross-sectional configuration of said ropes and providing them with a predetermined cross-sectional shape, and conveyor means receiving the ropes from said lower sizing roller means, said ropes respectively having the configuration of ribbons respectively situated in parallel planes which make an angle of approximately 45 degrees with respect to an axis about which at least part of said shearing roller means rotates, so that the mass is sheared into said ribbons while displaced into said planes, and said sizing roller means situating said ribbons in planes which respectively are parallel to each other and perpendicular to said axis so that said ribbons are turned through an additional 45 degrees before reaching said sizing roller means.

5. The combination of claim 4 and wherein said sizing roller means maintains the spacing between said ropes while changing the thickness and width of said ropes, said sizing roller means operating at a speed greater than said shearing roller means to compensate for the decrease in cross-section of said ropes at said sizing roller means.

6. In a candy manufacturing apparatus, supply means for supplying a mass of plastic material, upper shearing roller means situated beneath said supply means for the receiving of the mass of plastic material therefrom and for shearing the entire volume of material received from said supply means into a plurality of ropes which advance continuously downward beyond said upper shearing roller means, lower sizing roller means situated beneath said shearing roller means and receiving said ropes therefrom for changing the cross-sectional configuration of said ropes and providing them with a predetermined cross-sectional shape, and conveyor means receiving the ropes from said lower sizing roller means, said shearing roller means including a pair of identical roller assemblies each composed of a series of annular roller elements arranged coaxially in a row directly in engagement with each other and all having the same orientation, each of said annular elements having an exterior peripheral surface of V-shaped cross section formed by a pair of intersecting oppositely inclined frustoconical surfaces one of which is substantially longer than the other, and said pair of identical roller assemblies having parallel axes along which they are respectively arranged in engagement with each other with one of said assemblies having a position which is the reverse of that of the other of the assemblies so that said peripheries of said annular elements butt against each other to define between themselves passages of rectangular cross section each situated in a plane inclined to said roller axes, whereby, when the mass of plastic material passes through said passages during rotation of said roller assemblies simultaneously in opposed directions which feed the mass through said passages and from said supply means, the mass is sheared into ropes of ribbon-shaped configuration corresponding in cross section to the cross-sectional configuration of said passages.

7. The combination of claim 6 and wherein said sizing roller means includes a pair of roller assemblies one of which defines a plurality of annular grooves having a width greater than the thickness of said passages and the other of which is composed of a plurality of discs slideably received in said grooves and having outer peripheries defining with the inner circular ends of said grooves a passage through which said ropes pass to have their thickness changed.

8. The combination of claim 7 and wherein one of said assemblies of said sizing roller means is shiftable toward and away from the other of said assemblies thereof while the axes of said assemblies remain parallel for the purpose of adjusting the thickness imparted to the ropes by said sizing roller means.

9. The combination of claim 8 and wherein a scraper means engages said assemblies of said sizing roller means for removing the ropes therefrom.

References Cited

UNITED STATES PATENTS

| 2,612,852 | 10/1952 | Morrison. | |
| 2,962,986 | 12/1960 | Olgiati | 107—69 |
| 2,923,259 | 2/1960 | Malnati | 107—68 |

WALTER A. SCHEEL, *Primary Examiner.*

JOSEPH SHEA, *Assistant Examiner.*

U.S. Cl. X.R.

107—54